United States Patent [19]
Imai
[11] 4,296,171
[45] Oct. 20, 1981

[54] TRANSFER SHEET SUITABLE FOR ELECTROPHOTOGRAPHIC PRESSURE-FIXING

[75] Inventor: Mitsuru Imai, Numazu, Japan

[73] Assignee: Ricoh Co., Ltd., Tokyo, Japan

[21] Appl. No.: 72,862

[22] Filed: Sep. 6, 1979

[30] Foreign Application Priority Data

Sep. 8, 1978 [JP] Japan ............................ 53-109601

[51] Int. Cl.$^3$ ...................... B05D 5/12; B32B 5/16; B32B 21/06; B32B 27/10

[52] U.S. Cl. ................................ 428/323; 427/121; 428/339; 428/342; 428/511; 428/514; 428/537

[58] Field of Search ............... 427/121, 146; 428/195, 428/207, 211, 511, 537, 323, 339, 340, 341, 342, 514

[56] References Cited

U.S. PATENT DOCUMENTS

| | | | |
|---|---|---|---|
| 3,870,559 | 3/1975 | Cowling et al. | 428/511 |
| 3,950,595 | 4/1976 | Tanaka et al. | 428/511 |
| 4,081,583 | 3/1978 | Akiyama et al. | 428/511 X |
| 4,081,584 | 3/1978 | Akiyama et al. | 428/511 X |

*Primary Examiner*—Bruce H. Hess
*Attorney, Agent, or Firm*—Blanchard, Flynn, Thiel, Boutell & Tanis

[57] ABSTRACT

A transfer sheet suitable for electrophotographic pressure fixing, which comprises a paper support and a thin layer of resin formed by coating, thereon as transfer-acceptable layer said resin being obtained by neutralizing carboxyl radical of a copolymer comprising methyl methacrylate, alkyl acrylate and/or alkyl methacrylate and unsaturated carboxylic acid as constitution units with ammonia or some volatile amine.

6 Claims, No Drawings

TRANSFER SHEET SUITABLE FOR ELECTROPHOTOGRAPHIC PRESSURE-FIXING

BACKGROUND OF THE INVENTION (A) Field of the Invention

The present invention relates to a transfer sheet suitable for electrophotographic pressure-fixing, and particularly it relates to a transfer sheet suitable for electrophotographic pressure-fixing which renders it possible to transfer thereto a dry-toner image formed on an electrophotographic sensitive material or an electrostatic recording material and fix the thus transferred toner image under pressure.

(b) Description of the Prior Art

As conventional transfer sheets for use in pressure-fixing of dry toner, there are known a sheet prepared by coating some rubber latex on a paper support, a sheet prepared by coating a mixture obtained by adding some pigment to a rubber latex on a paper support, etc. These conventional transfer sheets are admittedly superior in pressure-fixability because of the employment of rubber latex for the toner-accepting layer (to wit, transfer-accepting layer). However, a transfer sheet of the former type is defective in that (1) due to the viscosity inherent in the rubber latex, blocking of like sheets is apt to take place, (2) as the sheet is coated with a film of fine quality, it is very glossy and lacks the touch of ordinary paper, and (3) it is poor in easiness of writing with pencil, ink, etc. In the case of a transfer sheet of the latter type, on the other hand, the foregoing defects (1), (2) and (3) are made up for to some extent, but it is not satisfactory yet.

SUMMARY OF THE INVENTION

One object of the present invention is to provide a transfer sheet suitable for electrophotographic pressure-fixing which is free from the foregoing of conventional transfer sheets and is particularly superior in paper-likeness as well as writability. Another object of the present invention is to provide a transfer sheet suitable for electrophotographic pressure-fixing which is superior in transferability even at the time of high humidity and can be manufactured by simple means.

In other words, a transfer sheet suitable for electrophotographic pressure-fixing under the present invention is characterized in that it is prepared by forming a transfer-accepting layer by coating an aqueous solution or aqueous dispersion consisting essentially of a resin obtained by neutralizing carboxyl radical of a copolymer comprising (a) methyl methacrylate, (b) alkyl acrylate (wherein the alkyl radical has 6 or more carbon atoms) and/or alkyl methacrylate (wherein the alkyl radical has 6 or more carbon atoms) and (c) unsaturated carboxylic acid as structural units with ammonia or some volatile amine, on at least the dry-toner accepting side of a paper support and drying therafter.

DETAILED DESCRIPTION OF THE INVENTION

To give further particulars of the present invention, a transfer sheet according to the invention is prepared by coating at least one side of a paper support (to wit, an ordinary paper) with an aqueous dispersion consisting essentially of a specific resin and drying thereafter, thereby forming a transfer-accepting layer.

Said specific resin to be employed for the present invention is, as described above, obtained by neutralizing carboxyl radical of a copolymer comprising methyl methacrylate (hereinafter referred to as component A), alkyl acrylate (wherein the alkyl radical has 6 or more carbon atoms) and/or alkyl methacrylate (wherein the alkyl radical has 6 or more carbon atoms) (hereinafter referred to as component B) and unsaturated carboxylic acid (hereinafter referred to as component C) as structural units, with ammonia or some volatile amine. In this connnection, the number of carbon atoms of the alkyl radical of said component B is supposed to be 6 or more, preferably in the range of from 10 to 20.

To cite concrete examples of desirable substances to be applied as component C, there are acrylic acid, methacrylic acid, itaconic acid, etc. Besides, both of said component B and component C can be applied either individually or upon combining two kinds or more thereof.

Referring to the amount of component A, component B and component C as structural units of said copolymer, component A accounts for 40 to 90% by weight, preferably 60 to 90% by weight, component B accounts for 3 to 6% by weight, preferably 5 to 30% by weight, and component C accounts for 0.5 to 10% by weight, preferably 2 to 6% by weight. In the case here the amount of component A is less than 40% by weight, the glass transition point descends and the resulting coating film comes to be of fine quality, entailing poor writability, while in the case where the amount of component A exceeds 90% by weight, the film forming effect is impaired. In the case where the amount of component B is less than 3% by weight or exceeds 60% by weight, there are caused troubles similar to that described on component A above. And, in the case where the amount of component C is less than 0.5% by weight, it becomes difficult to neutralize the foregoing copolymer with ammonia or volatile amine so as to make it water soluble or water dispersible, while in the case where it exceeds 10% by weight, the transferability at high humidity of the resulting transfer sheet becomes inferior.

The appropriate molecular weight of the resin obtained by neutralizing carboxyl radical of said copolymer with ammonia or volatile amine is in the range of from 5,000 to 100,000, preferably from 10,000 to 40,000, in terms of gravimetric average molecular weight. In the case where the molecular weight is less than 5,000, the resulting coating film becomes poor in strength and causes blocking of the sheet, while in the case where it exceeds 100,000, the pressure fixability becomes inferior.

In order to manufacture this resin practically, it suffices to copolymerize component A, component B and component C at a fixed weight ratio by the well-known method and thereafter neutralize the resulting copolymer with ammonia or volatile amine.

And, a transfer sheet according to the present invention is a sheet prepared by forming a transfer-accepting layer (to wit, resin layer) consisting of the aforedescribed specific resin on a paper support, but this resin may be applied upon mixing with the conventional rubber latex and various substances other than the specific resin defined for the present invention, such as acrylic emulsion, vinyl acetate emulsion, etc., as occasion demands to the extent of 50% by weight or less; when the amount of these additional substances exceeds 50% by weight, the amount of the specific resin defined for the present invention becomes relatively small and accomplishment of the objects of the invention cannot be expected.

Further, for the purpose of imparting paper-likeness to the transfer sheet, it also, will do to mix some pigment (e.g., inorganic pigment, plastic pigment, etc.) having an average particle size of 0.5 to 5 μm in the specific resin. As applicable inorganic pigment for this purpose, calcium carbonate, zinc oxide, titanium oxide, silica, talc, clay, barium sulfate, etc. can be cited, and as applicable plastic pigment, plastic particles of urea resin, polycarbonate, styrene resin, vinyl chloride resin, etc. can be cited. Moreover, in order to prepare a colored sheet, some coloring agent (pigment; dye) having an average particle size of 0.5 to 5 μm can be mixed in the specific resin. The appropriate mixing ratio of the coloring agent to the specific resin is in the range of 0–2:1, preferably 0.5–1.5:1 by weight.

The appropriate amount, in dry weight, of an aqueous solution or an aqueous dispersion to be coated on the paper support for the purpose of forming a transfer-accepting layer as above is n the range of from 1 to 10 g per square meter, preferably from 2 to 5 g per square meter, of one side of the support. As a matter of course, it also will do to coat it on both sides of the paper support. It is advantageous from the view point of stability in manufacturing as well as cost that water solvent can be employed for the transfer-acceptable layer forming liquid. As regards the method of coating, any of the well-known means, such as air-knife coating, wire-bar coating, rod coating, etc., is applicable. Further, as regards the density of the foregoing coating liquid (to wit, aqueous solution or aqueous dispersion), taking the conveniency for coating into consideration, the appropriate density in terms of solid content is in the range of from 10 to 50% by weight or thereabouts. And, the appropriate temperature for drying is in the range of from 80° to 150° C.

As regards the pressure-fixing process for obtaining an image by employing a transfer sheet of the present invention prepared as above, it suffices to be conventional one such as disclosed in Japanese Patent Publication No. 15876/1971.

As regards the toner to bring an image on a transfer sheet of the present invention, any toner will do so long as it is in common use for pressure-fixing. For instance, a toner containing a block polymer consisting of a hard polymer such as styrene, alkyl(metha)acrylate, acrylonitrile, etc. and a soft polymer such as alkylene oxide, siloxane, caprolactone, urethane, polyolefine wax, etc. as resin component and toners disclosed in Japanese Unexamined Patent Publication No. 78936/1973, No. 50042/1975, No. 139745/1975, No. 36947/1976, No. 64931/1976, No. 68833/1976, No. 68834/1976, No. 70647/1976, No. 87041/1976, No. 87042/1976, No. 96330/1976, No. 99529/1976, etc. are all applicable.

The above described transfer sheet according to the present invention has very desirable properties. That is, this transfer sheet is equal to the conventional transfer sheets for use in electrophotographic pressure-fixing in respect of fixability, but it is superior in all other respects. The reasons for this are yet to be scrutinized, but when a transfer sheet of this invention is microscopically examined, there is observed the presence of fine undulations and/or cracks on the surface of the coating film (or transfer-accepting layer) which is likely to bring paper-likeness and good writability of the present sheet. Besides, as the coating film is harder than a rubber latex film, the writability with pencil is also improved.

Furthermore, in the case of transferring a conductive or a semiconductive toner, many of the conventional transfer sheets have been defective in that the transferability thereof would extremely deteriorate especially at the time of high humidity. In the case of a transfer sheet of the present invention, however, even when such a toner is employed, it shows remarkable amelioration in this respect. This is considered ascribable to the facts that the present sheet scarcely has a hydroscopic property and the electric resistance of the transfer-acceptable layer does not lower.

DESCRIPTION OF THE PREFERRED EMBODIMENTS

Example 1

At the weight ratio of methyl methacrylate:lauryl methacrylate:acrylic acid = 8:1.5:0.5, copolymerization was effected, and carboxyl radical of the resulting copolymer was neutralized with ammonia.

| | |
|---|---|
| resin obtained the foregoing process (solid content: 20%) | 100 g |
| heavy calcium carbonate (Whiton SB, the manufacture of SHIRAISHI Calcium Co.) | 20 g |
| water | 1000 g |

A composition consisting of the above components was dispersed with homo-mixer for 20 minutes, and the resulting dispersion was coated on a slick paper weighing 60 g/m$^2$ as made of hardwood pulp, by means of an air-knife coater to the extent of about 3 g/m$^2$ and was dried thereafter, whereby a transfer sheet (A) was manufactured.

Meanwhile, a selenium semiconductor was electrified by means of a corona charger, and after image-wise exposure thereof, magnetic brush developing was conducted by the use of a magnetic one-component type toner (having electric resistance of about $10^8\Omega\cdot$cm). Subsequently, the toner image formed on said selenium semiconductor was transferred to said transfer sheet (A) through the corona-charge transferring process and was fixed by means of a couple of metal rollers (the fixing pressure was set at 30 Kg/cm in terms of line pressure).

When the density of image was measured by means of Macbeth's reflex densitometer, it was 1.2. When this image area was stripped off by the use of a commercial cellotape to measure the fixability thereof, the value was 80%. In this context, the fixability was reckoned by applying the following formula:

$$\text{fixability} = \frac{\text{image density after stripping-off of cellotape}}{\text{image density before stripping-off of cellotape}} \times 100$$

Further, when the retouchability was examined by the use of black ink manufactured by PILOT Co., there was observed no break of writing and the drying of ink was satisfactory. Also, the transfer sheet was free from blocking.

Next, when an image was formed on the transfer sheet in the same way as above in an atmosphere of 30° C. and 80% RH, the image density was as high as 1.0 in spite of high humidity.

Example 2

At the weight ratio of methyl methacrylate:lauryl methacrylate:methacrylic acid=7:2.5:0.5, copolymerization was effected, and carboxyl radical of the resulting copolymer was neutralized with volatile amine.

| | |
|---|---|
| resin obtained through the foregoing process (solid content: 20%) | 100 g |
| polystyrene pigment (Dow 722, the manufacture of Dow Chemical Corp.) | 20 g |
| water | 1000 g |

A composition consisting of the above components was employed for manufacturing a transfer sheet (B) through the same procedure as in Example 1. When the fixability of this transfer sheet (B) was measured in the same way as in Example 1, it was 75%. Also, this sheet was satisfactory in re-touchability and free from blocking.

Next, when an image was formed on this sheet in the same way as in Example 1 in an atmosphere of 30° C. and 80% RH, the image density was 0.95.

Example 3

At the weight ratio of methyl methacrylate:octyl acrylate:itaconic acid=8:1.5:0.5, copolymerization was effected, and carboxyl radical of the resulting copolymer was neutralized with ammonia. The molecular weight of the thus obtained resin was about 20,000 on the gravimetric average.

| | |
|---|---|
| resin obtained as above (solid content: 20%) | 100 g |
| clay (Ultra White 90, the manufacture of Engelhard Minerals & Chemicals Corp.) | 20 g |
| water | 1000 g |

A composition consisting of the above components was dispersed with a homo-mixer for 20 minutes, and the resulting dispersion was coated on both sides of a slick paper by means of an air-knife coater to the extent of about 4.5 $g/m^2$ for each side and was dried thereafter, whereby a transfer sheet (C) was manufactured. When the fixability of this transfer sheet (C) was measured in the same way as in Example 1, it was 85%. Further, when the luster of this sheet was measured with a gloss measuring apparatus manufactured by NIPPON DENSHOKU Co., it was 8% and free from flitter, and the touch of the sheet was equal to that of an ordinary slick paper.

When an image was formed on this sheet in the same way as in Example 1 in an atmosphere of 30° C. and 80% RH, the image density was 1.1.

EXAMPLE 4

At the weight ratio of methyl methacrylate:lauryl acrylate:acrylic acid=8.5:1.0:0.5, copolymerization was effected, and carboxyl radical of the resulting copolymer was neutralized with ammonia.

| | |
|---|---|
| resin obtained through the foregoing process (solid content: 20%) | 100 g |
| SBR (solid content: 48%; SK-72, the manufacture of TAKEDA YAKUHIN Co.) | 20 g |
| calcium carbonate (Whiton SSB, the manufacture of SHIRAISHI Calcium Co.) | 30 g |

-continued

| | |
|---|---|
| water | 1000 g |

A composition consisting of the above components was employed for manufacturing a transfer sheet (D) through the same procedure as in Example 1. When the fixability of this transfer sheet (D) was measured in the same way as in Example 1, it was 87%. Also, this sheet was satisfactory in re-touchability and free from blocking.

Comparative Example

| | |
|---|---|
| SBR (solid content: 48%; SK-72, the manufacture of TAKEDA YAKUHIN Co.) | 100 g |
| clay (Ultra White 90, the manufacture of Engelhard Minerals & Chemicals Corp.) | 50 g |
| water | 500 g |

A composition consisting of the above components was employed for manufacturing a transfer sheet through the same procedure as in Example 1. When the fixability of this transfer sheet was measured in the same way as in Example 1, it was 87%.

However, the luster of this transfer sheet was 30% and was attended with glitter. Besides, when the re-touchability thereof was examined, there was observed some break of writing, and the ink failed to dry even when left alone for 1 minute. Further, occurrence of partial blocking was observed at the time of passing the sheet through fixing rollers.

What is claimed is:

1. A transfer sheet adapted to have an electrophotographic image of dry toner affixed thereto by pressure, comprising: a paper support coated on at least one surface thereof with a transfer-accepting layer wherein the amount of said transfer-accepting layer is from 1 to 10 g per square meter of said paper support, on a dry basis, said transfer-accepting layer having been formed by applying on said paper support a coating of an aqueous solution or an aqueous dispersion of a resin obtained by neutralizing, with ammonia or volatime amine, the carboxyl groups of a copolymer consisting essentially of from 40 to 90% by weight of methyl methacrylate, from 3 to 60% by weight of acrylate selected from the group consisting of alkyl acrylate having 6 or more carbon atoms in the alkyl group, alkyl methacrylate having 6 or more carbon atoms in the alkyl group and mixtures thereof, and from 0.5 to 10% by weight of unsaturated carboxylic acid, said resin being water-soluble or water-dispersible and having a gravimetric average molecular weight of from 5,000 to 100,000, and then drying said coating to form said transfer-accepting layer, said transfer-accepting layer having fine cracks on the surface thereof.

2. A transfer sheet according to claim 1, in which said transfer-accepting layer contains rubber latex, acrylic emulsion or vinyl acetate emulsion in an amount of up to 50% by weight, based on the weight of said layer.

3. A transfer sheet according to claim 1 or 2, in which a pigment having a particle size of 0.5 to 5 $\mu m$ is mixed in said transfer-accepting layer.

4. A transfer sheet according to claim 1 or 2, in which a coloring agent is mixed in said transfer-accepting layer.

5. a transfer sheet according to claim 4, in which the amount of said coloring agent is 2 parts by weight or less per 1 part by weight of said resin.

6. A transfer sheet as claimed in claim 1 in which the amount of said transfer-accepting layer is from 2 to 5 g per square meter, on a dry basis; and, in said copolymer, the amount of said methyl methacrylate is from 60 to 90% by weight, the amount of said acrylate is from 5 to 30% by weight and said alkyls have 10 to 20 carbon atoms, and the amount of said unsaturated carboxylic acid is from 2 to 6% by weight and said unsaturated carboxylic acid is selected from the group consisting of acrylic acid, methacrylic acid, itaconic acid and mixtures thereof; and the gravimetric average molecular weight of said resin is from 10,000 to 40,000.

* * * * *